April 9, 1929.  O. LARSEN  1,708,273
VALVE
Filed July 9, 1926
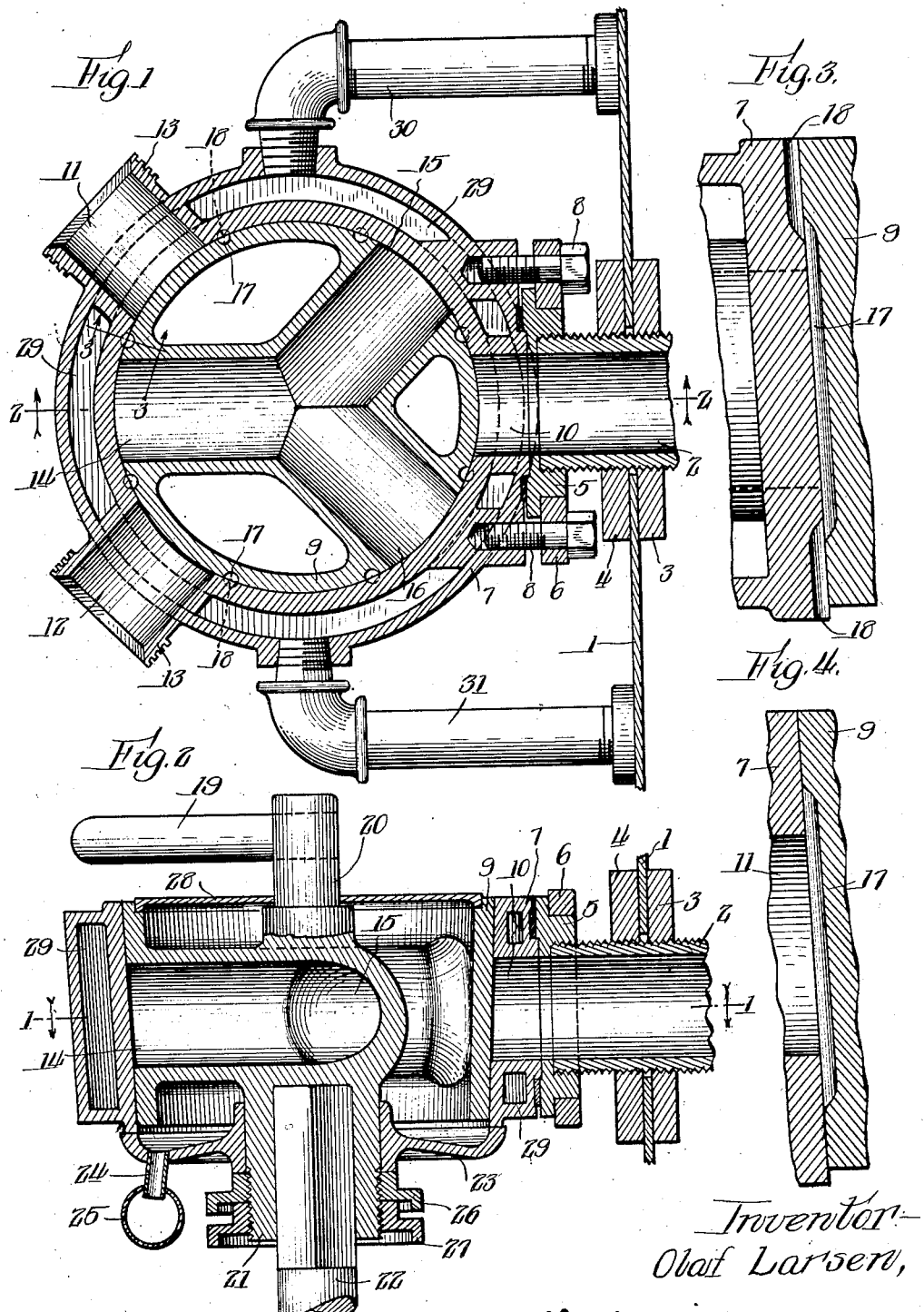

Patented Apr. 9, 1929.

1,708,273

UNITED STATES PATENT OFFICE.

OLAF LARSEN, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

VALVE.

Application filed July 9, 1926. Serial No. 121,293.

The invention relates more particularly to valves for the control of edible fluids, commonly known as sanitary valves.

In milk pasteurization, one of the commonly practiced methods is to hold quantities of the milk at a predetermined temperature for a predetermined time in suitable containers, the containers being filled and emptied through piping controlled by sanitary valves. It will be obvious that any leakage or failure in these valves will permit the uncontrolled flow to or from the container of a quantity of milk which has not been held for the required time at the necessary temperature. If such leakage is permitted to pass into the discharge line with the properly pasteurized milk, the latter is in danger of reinoculation by the undestroyed bacteria in the milk which has escaped the prescribed treatment.

It is the principal object of this invention to provide an improved sanitary valve for controlling the filling and emptying of pasteurizing holders which is constructed to intercept and direct outwardly from the main passages any leakage occurring in the valve when it is in closed position.

Other objects and advantages will be apparent in the following detailed description of a preferred embodiment of the invention which I have selected for illustration in the accompanying drawings. It will be understood, however, that various changes in form, construction and arrangement may be made by those skilled in the art without departing from the scope and spirit of the invention as expressed in the appended claims.

Referring to the drawings, Fig. 1 is a sectional plan of the valve structure taken on the plane of the line 1—1 in Fig. 2. Fig. 2 is a sectional elevation of the same structure taken on the plane of the line 2—2 in Fig. 1. Fig. 3 is a fractional sectional elevation taken on the plane of the line 3—3 in Fig. 1, illustrating the leakage intercepting grooves positioned in the valve member and its bearing seat in their relation when the valve is closed. Fig. 4 is a similar view illustrating the relation of the grooves when the valve member is in operation to or from closed position.

The reference numeral 1 indicates a portion of the side wall of a hot water reservoir within which is supported a well (not shown) adapted to receive milk to be held during the pasteurizing period. The milk is delivered to and discharged from the well through a pipe 2 communicating therewith and passing outwardly through the reservoir wall 1, the pipe 2 preferably being supported upon the wall as by a pair of washers 3 and 4 screwthreaded on the pipe and turned up to clamp the wall 1, thereby forming a sealed joint about the pipe. The outer end of the pipe 2 preferably carries a bearing plate 5 secured thereon, the plate 5 being radially recessed to adjustably carry a bolt supporting plate 6.

A valve casing 7 is positioned outwardly of the end of the pipe 2, the adjacent lateral portion of the casing being constructed for a bearing support in abutment with the plate 5 and removably secured thereto by bolts 8 carried by the plate 6 and threaded into the structure of the adjacent casing wall. The casing 7 laterally encloses a circular valve chamber, the walls of which are preferably tapered to form the seat for a removable valve plug 9 rotatably positioned therein. The casing 7 is provided with a port 10 opening from the valve chamber in register with the pipe 2 and communicating therewith. The ports 11 and 12 in the casing function as inlet and outlet ports to the valve chamber, the casing being provided with suitable structure for the attachment of inlet and outlet piping, as the nipples 13.

The plug 9 is traversed by a three-way passage comprising the branch passages 14, 15 and 16. The branch passages are arranged so that by rotating the plug 9 until the passage 14 is in communicating register with the port 11, the port 12 is closed and the passage 15 is in register with the port 10, thus permitting the filling of the milk holding well through the pipe 2. By reversely rotating the plug 9 to the position illustrated in Fig. 1, all ports are closed for the holding period required for pasteurization of the milk. By further reverse rotation of the plug 9, the passage 14 is moved into register with the port 12, and the passage 16 with the port 10, thereby permitting the discharge of the milk from the holding well while the inlet port 11 is closed.

In the operation of a valve of the plug type as here disclosed, it may be that the bearing surfaces of the plug or its seat may become scored, or for other reason the plug become not snugly seated all around its bearing surface.

In such event there is possibility in the ordinary construction that there may be leakage about the plug directly from the inlet to the outlet port of milk which thereby escapes the pasteurization treatment. Or there may be leakage about the plug from the holding well connecting passage to the outlet, thereby permitting some of the milk to escape holding for the required period of time. Such leakage into the discharge line is highly objectionable as defeating the object of pasteurization to destroy all pathogenic bacteria in the milk.

My improvement as herein disclosed makes possible the satisfactory employment of this otherwise advantageous type of valve with three way connections by positively diverting outwardly of the normal passages of the valve structure any leakage that may occur between the plug and its seat. Referring to Fig. 1, a series of longitudinal channels are indicated at 17 which are formed in the bearing surface of the plug and positioned a space from each side of each branch passage opening in the plug, and also at each side of each port opening in the casing, the channels 17 functioning to intercept any leakage occurring about the plug from any of the openings mentioned. The channels 17 in the plug do not extend the full bearing length of the plug, both ends of each channel being spaced inwardly from the respective margins of the bearing surface of the plug in its seat. If the channels extended the full length of the plug and opened outwardly of the valve structure, it is obvious that excessive loss of milk would occur in the normal operation of the valve when the channels passed either of the port openings. Also, if full length channels were formed in the seat adjacent the openings, instead of in the plug, excessive loss would occur in operation as the plug passage openings in intermediate position would overlap both a port opening and one of the adjacent channels. The latter described difficulty might be avoided by greatly increasing the diameter of the plug in relation to the cross dimension of the port and passage openings so that the spacing of the channels in the seat from the port openings may be greater than the cross dimension of the passages, but such an arrangement would involve excessive size and weight of parts and excessive friction in operation to a degree wholly impractical for the purpose of the valve.

To avoid all of these difficulties in a three-way valve of compact dimensions and easy of operation, I have provided co-operating short channels 18 in the upper and lower marginal portions of the valve seat, the inner ends of which overlap the ends of the channels 17 in the valve plug when the latter are in alinement with the channels 18. When the valve plug is in one of its three operative positions, that is, when filling the milk well, when discharging the milk well, or when holding the contents of the milk well with all of the valve ports closed, the channels 17 and 18 are in overlapping relation as shown in Fig. 3, forming free passages with their ends opening outwardly of the top and bottom of the valve, and extending entirely across the contacting surfaces of the valve plug and its seat. The co-operating channels 17 and 18 are positioned so that, with the valve plug in either of the three positions mentioned, an open intercepting passage is provided at each side of each of the ports 10, 11 and 12, and any milk escaping from any of the ports around the plug is intercepted and drained outwardly of the valve structure.

As the valve plug is rotated from one to another of its normal positions, the alinement of the channels 17 and 18 is broken, and no loss occurs by direct flow from the ports 10, 11 and 12, as the channels 17 cross those ports, because the valve seat is sealed above and below the ends of the channels 17, as shown in Fig. 4. The channels 18 do not extend far enough into the valve seat to be in the path of the plug passages 14, 15 and 16, so that no loss occurs from the overlapping by the plug passages of the ports and channels. Any milk trapped in the channels 17 in the operation of the valve plug is immediately drained away when the plug comes to rest in either of its operative positions.

The valve plug may be operated by any suitable means. As herein illustrated, a handle 19 is provided for manual operation, the handle being carried by an upper axial extension 20 of the plug structure. A lower axial extension 21 of the plug structure may be provided with a suitable socket to receive an operating shaft 22, the latter being driven by automatic mechanism designed to operate the valve at predetermined time intervals.

It is preferable to take care of the drainage from the leak intercepting grooves, by the provision of a catch pin 23 loosely mounted on the plug extension 21 and outwardly bearing upon the under surface of the valve casing to effect a sanitary closure of the drainage collecting space. An outlet 24 from the catch pan leads to a pipe 25 for conducting the leakage to any suitable receptacle. The pan 23 also serves as means for securing the plug in its seat with adjustable tension, the outer end of the plug extension 21 being threaded to receive a retaining nut 26 adjustably abutting the pan 23, and a lock nut 27 for securing the adjusted position of the retaining nut. The plug 9 is preferably of hollow structure and may be provided with a removable cover plate 28 to effect a sanitary closure above the catch pan.

It is desirable also to heat the valve structure to a degree similar to that of the holding wells so that any milk trapped in the plug passages after filling the well may be held up to the pasteurizing temperature. This is preferably accomplished by providing a hot water jacket for the valve structure. As illustrated herein the valve casing 7 is constructed with internal inter-connected hot water circulating spaces 29, the latter being in communication with the hot water reservoir through the connecting pipes 30 and 31 entering the reservoir wall 1. Any suitable mechanical or thermal means may be employed for causing circulation of the hot water from the reservoir through the connecting pipes 30 and 31 and the spaces 29 in the valve casing.

I claim as my invention:

1. In a device of the class described, a casing having a plurality of ports, and a valve member operatively seated in said casing to control said ports and having passages therethrough adapted to be moved into and out of register with said ports in the operation of said valve member, said casing and said valve member having between their coperating bearing surfaces a plurality of leakage diverting passages formed in and traversing said bearing surfaces between said ports, each of said latter passages comprising a pair of oppositely positioned channels formed in the marginal portions of one of said bearing surfaces having open outer ends and closed inner ends spaced from each other, and a co-operating channel formed in the inner portion of the other of said bearing surfaces having closed ends, said last mentioned channel being arranged to overlap the inner ends of said first mentioned pair of channels to form a continuous free passage across said bearing surfaces only when said valve member is in one of its normal positions.

2. In a device of the class described, a rotatable valve member, and a bearing seat therefor having a port opening controlled by said valve member, the co-operating bearing surfaces of said valve member and said seat having transverse channels formed therein of substantially less length than the cross dimension of said bearing surfaces, said channels being positioned so that when said valve member is in normal port-closing position said channels are in overlapping relation forming a continuous open passage from margin to margin of said bearing surfaces.

3. In a device of the class described, a valve seat having a port therein, and a valve member in slidable contact with said seat and controlling said port, said valve seat and valve member having transverse channels formed in their co-operating bearing surfaces, each of said channels extending only partially across the bearing surface in which it is formed, said channels being positioned so that when said valve member is in normal port-closing position said channels are in overlapping relation forming a continuous open passage extending entirely across said bearing surfaces.

4. In a device of the class described, a rotatable valve member, and a bearing seat therefor having a port opening controlled by said valve member, the cooperating bearing surfaces of said valve member and said seat having transverse channels formed therein of substantially less length than the cross dimension of said bearing surfaces, said channels being positioned so that when said valve member is in normal port-closing position said channels are in overlapping relation forming a continuous passage at each side of said port and opening outwardly from the margin of said bearing surfaces.

In witness whereof I have hereunto attached my signature.

OLAF LARSEN.